Figure 1:
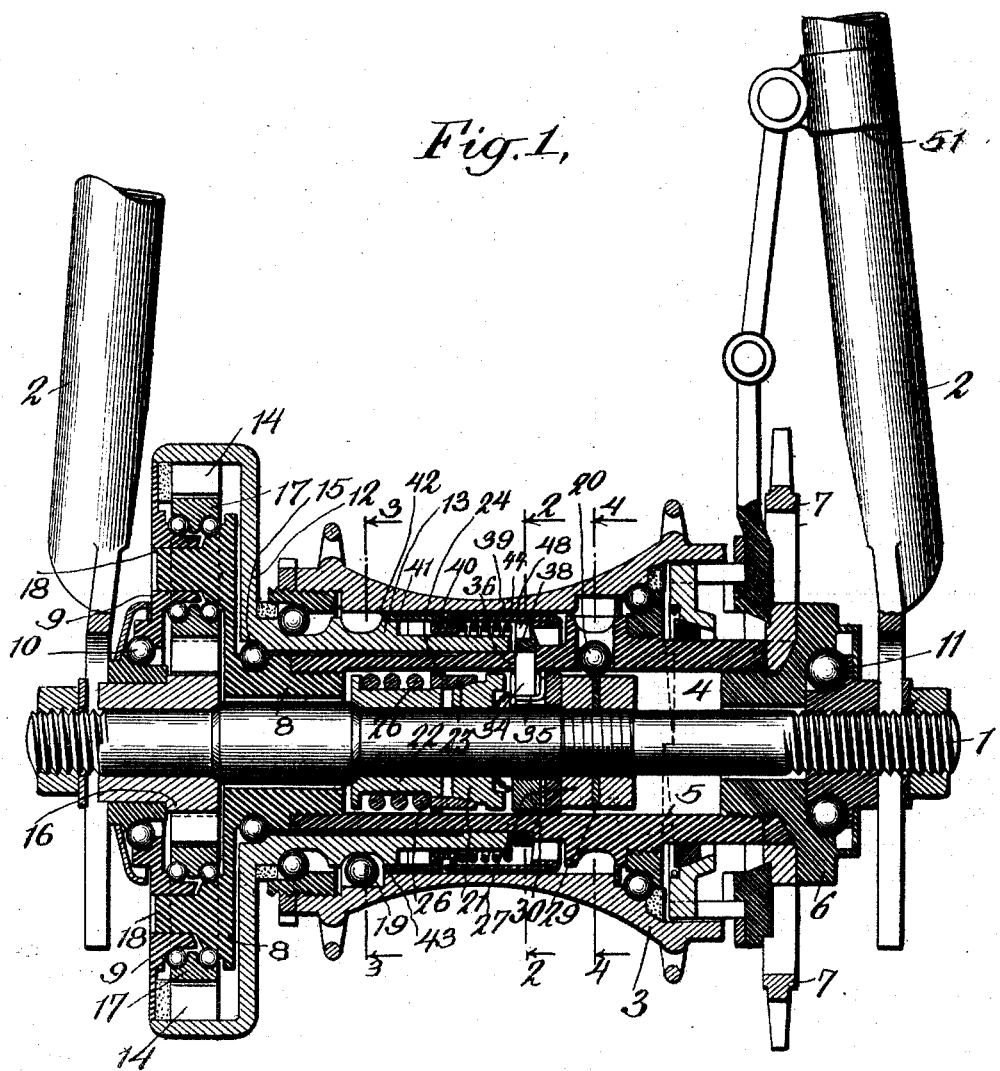

No. 776,750. PATENTED DEC. 6, 1904.
H. F. MAYNES.
BICYCLE GEARING AND CONTROLLING MECHANISM THEREFOR.
APPLICATION FILED MAR. 14, 1904.
NO MODEL. 2 SHEETS—SHEET 1.

WITNESSES: INVENTOR

No. 776,750. PATENTED DEC. 6, 1904.
H. F. MAYNES.
BICYCLE GEARING AND CONTROLLING MECHANISM THEREFOR.
APPLICATION FILED MAR. 14, 1904.
NO MODEL. 2 SHEETS—SHEET 2.
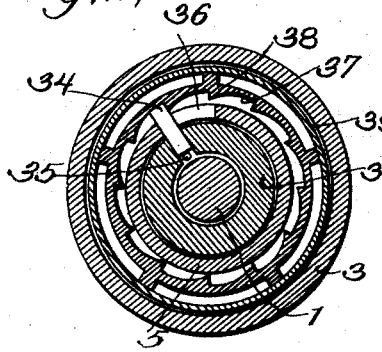
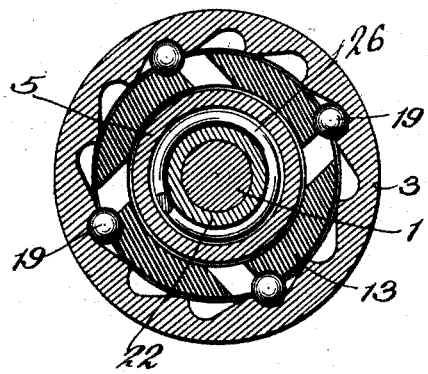
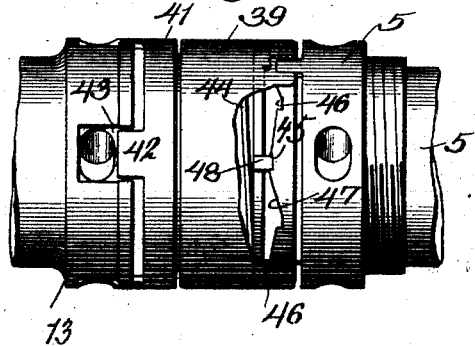
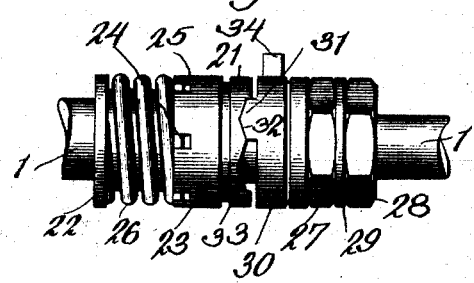
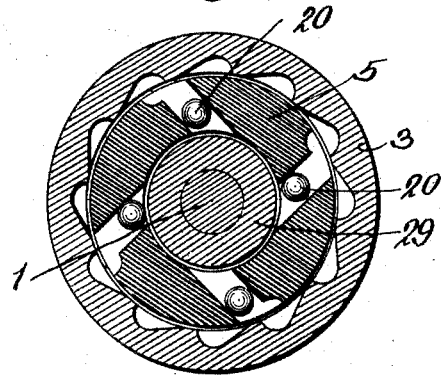
WITNESSES:
INVENTOR
BY
ATTORNEYS No. 776,750. Patented December 6, 1904.

UNITED STATES PATENT OFFICE.

HYLA F. MAYNES, OF CORNING, NEW YORK.

BICYCLE-GEARING AND CONTROLLING MECHANISM THEREFOR.

SPECIFICATION forming part of Letters Patent No. 776,750, dated December 6, 1904.

Application filed March 14, 1904. Serial No. 197,911. (No model.)

*To all whom it may concern:*

Be it known that I, HYLA F. MAYNES, a citizen of the United States of America, residing at Corning, county of Steuben, State of New York, have invented certain new and useful Improvements in Bicycle-Gearing and Controlling Mechanism Therefor, of which the following is a specification, reference being had to the accompanying drawings, forming a part thereof.

My invention relates to bicycle-gearing in which provision is made for driving at different speeds, and relates particularly to clutch-controlling means by which change is made from one driving speed to another.

In the class of gearing to which my invention is particularly applicable a plurality of concentric driving-sleeves are arranged within the hub to rotate at different speeds, and ball-clutches connect one or other of the sleeves to the hub, in accordance with the speed at which it is intended to be driven. The clutch-controller of my present invention comprises a sleeve arranged concentrically with the driving-sleeves and adapted to be moved longitudinally thereof to release or retain the balls of the high-speed clutch, according to whether or not it is desired that the clutch shall operate at the time. In mechanism of this description it is not necessary to control the low-speed clutch at all, because when the high-speed clutch operates the low-speed clutch will be overrun, while at the time the high-speed clutch is not operated it is desired that the low-speed clutch shall operate. Clutch-controlling mechanism may of course be employed to operate the low-speed clutch, if desired.

In a previous patent granted to me, No. 696,349, dated March 25, 1902, I have shown a clutch-controlling sleeve adapted to rotate with respect to the sleeve carrying it. My present invention is designed as an improvement on this form of clutch-controller as being more positive in its operation, less likely to creep or shift its position when not desired, and more easily operated.

I will now proceed to describe mechanism embodying my invention and will then point out the novel features in claims.

In the drawings, Figure 1 shows a view in central longitudinal section in bicycle-gearing, including clutch-controlling mechanism embodying my invention. Fig. 2 shows a view in transverse section thereof, the plane of section being taken upon the plane of the line 2 2 of Fig. 1. Fig. 3 shows a view in transverse section thereof, the plane of section being taken upon the plane of the line 3 3 of Fig. 1. Fig. 4 shows a view in transverse section thereof, the plane of section being taken upon the plane of the line 4 4 of Fig. 1. Fig. 5 is a detail view in elevation of the clutch-controlling sleeves and certain correlated parts. Fig. 6 is a view in elevation of the cone-clutch, the pawl-carrier, and certain correlated parts.

In the embodiment of my invention herein the usual stationary axle 1 is provided, rigidly secured to the rear stays 2 of a bicycle. The rear or driving wheel of the bicycle is represented by its hub 3, and the said hub is mounted to rotate upon suitable ball-bearings with respect to the stationary axle 1 and intermediate parts. Interposed between the hub 3 and the axle 1 are two driving-sleeves, one of which, for purposes of this specification, I designate the "high-speed" sleeve and the other the "low-speed" sleeve. The low-speed sleeve is designated in the drawings as a whole by the reference character 4 and comprises a shell 5, carrying at one end a ball-race 6, between which and the end of the shell 5 is removably clamped a driving member 7, a gear-carrier 8, and an end support and ball-race 9. Ball-bearings 10 support the low-speed sleeve at one end and ball-bearings 11 support the same at its opposite end.

The high-speed sleeve (designated in the drawings as a whole by reference character 12) comprises a shell or hub 13 and an internal gear-ring 14. The inner end of the high-speed sleeve rests upon and is supported by the low-speed sleeve, while the end nearest the gear-ring is provided with a ball-bearing 15, arranged between it and the low-speed sleeve. A stationary gear 16 is shrunk upon or otherwise rigidly secured to the stationary spindle 1 and planetary gear-wheels 17 supported on studs 18 upon the gear-carrier 8 of the low-speed sleeve and mesh with the teeth of the said stationary gear 16 and the teeth of the internal gear-ring 14 of the high-speed sleeve. A ball-clutch 19 is arranged between the shell of the high-speed sleeve and the hub 3, and another ball-clutch is arranged between the said hub 3 and the low-speed sleeve. The respective sleeves are provided with pockets into which the balls may be received when not in operative position, such pockets being shown more clearly in Figs. 3 and 4 of the drawings, (and the balls being shown as contained in the pockets of Fig. 4,) while the hub is provided at its interior with notches to receive the balls when operatively acting as a clutch. The clutch 19, operating in connection with the high-speed sleeve, I term the "high-speed" clutch, and similarly I term the clutch 20, operating in connection with the low-speed sleeve, the "low-speed" clutch. In the drawings the high-speed clutch 19 is shown operatively connected, while the balls of the low-speed clutch are shown as within the pockets and disconnected from operative engagement. With the parts in this position drive will be effected as follows: Power being applied to the driving member 7, the low-speed sleeve will be revolved at the same speed as the driving member. This will give the planetary gears 17 a planetary motion around the stationary gear 16 and will transmit a driving movement to the high-speed sleeve 12 by reason of the engagement of the said planetary gears with the internal gear-ring 14. The high-speed clutch 19 at such times locking the high-speed sleeve with the hub 3, the hub will be rotated at the same speed as the high-speed sleeve, and hence at a relatively high speed with respect to the speed of rotation of the driving member and low-speed sleeve. With the position of the clutches 19 and 20 reversed—that is to say, with the low-speed clutch 20 in operative position and the high-speed clutch held out of operative position—the drive will be direct from the low-speed sleeve to the hub, while the high-speed sleeve will at such time be rotated freely at its higher rate of speed, but being out of clutch connection with the hub will not affect it.

I will now proceed to describe the means for changing from one gear to the other. This change is effected by a back-pedaling movement of the power-transmitting member and without the intermediation of any operating devices other than those directly connected to or operated by the power-transmitting means itself. The clutch-controlling mechanism comprises a cone-clutch having a relatively stationary member secured against rotation upon the stationary axle 1, and a relatively movable or floating member 21, arranged to rotate loosely upon the said axle. The relatively stationary member comprises a collar 22, shrunk upon or otherwise rigidly secured to the stationary axle 1, and a ring 23, having an internal cone-surface adapted to engage with a corresponding external cone-surface upon the loose or floating clutch 21, the said ring 23 secured against rotative movement with respect to the stationary collar 22, but permitted endwise movement with respect thereto. To effect this, the collar 22 is provided with fingers 24, which engage longitudinal slots 25 in the said ring, as more clearly shown in Fig. 6. A compression coil-spring 26 is arranged between the end of the ring 23 and a flange upon the collar 22, said spring tending to resist movement of the ring 23 in a direction away from the floating clutch member 21. It will be noted, however, that the movement of the spring 26 is limited by the fingers 24, and hence when the parts are in the position shown in the drawings the said spring will have no tendency to force the ring 23 farther toward the floating member of the clutch 21, but merely to resist a movement in the opposite direction. A nut or collar 27 is rigidly secured upon the stationary axle and is preferably locked in position thereon by a second nut or collar 28. As for convenience of manufacture the nuts or collars 27 and 28 are preferably hexagonal in outer contour, a cylindrical disk 29 is interposed between them to receive the balls of the ball-clutch 20 and to prevent their being caught or engaged by the angular portions of the nuts. Interposed between the stationary abutment formed by the collar or nut 27 and the floating member 21 of the clutch is a loose collar 30, which I term herein a "pawl-carrier." A light spring bears between the pawl-carrier 30 and the floating member 21 of the clutch to give same an initial tendency toward the stationary member of the clutch, so as to be ready to engage same, if desired. The pawl-carrier 30 is provided at one point with a projecting lug or tooth 31, (see particularly Fig. 6,) and the floating member 21 of the cone-clutch is provided with two notches 32 and 33, adapted to receive the said lug or tooth. In the normal running position of the parts the tooth 31 engages the notch 32 and the parts 30 and 21 normally rotate together. The pawl-carrier 30 is provided with a radial pawl 34, said radial pawl mounted in a radial slot in said pawl-carrier, (see particularly Fig. 2,) and a spring 35 normally tends to force said pawl outwardly. The outer end of the said pawl passes through a slot 36 in the shell 5 of the low-speed sleeve 4 and engages internal teeth 37 of a ratchet-ring 38, mounted to rotate upon the outer periphery of the said low-speed-sleeve shell 5. The length of the slot 36 in the shell 5 is sufficient to allow a play of movement of the pawl 34 therein a distance about equal to the length of one of the teeth 37 of the ring 38. In the normal running condition of the parts the rear wall of the slot 36 of the shell 5 engages the pawl 34 and causes the said pawl, its pawl-carrier, and the ring 38 to rotate with it. Surrounding the ratchet-ring 38 is a sleeve 39, which is engaged by projections 40 from the shell 5 of the low-speed sleeve, and is hence compelled to rotate therewith. The connection, however, is a slotted one, and hence the said sleeve 39, while compelled to rotate with the said shell, is permitted an endwise relative movement with respect thereto. At its end farthest away from the ratchet-ring 38 the sleeve 39 has rigidly secured thereto a trough-shaped ring 40, and a second sleeve 41, provided at its end nearest the sleeve 39 with an inwardly-projecting flange, engages the said trough-shaped ring and is thus secured to the sleeve 39, so as to positively partake of its endwise movement; but is permitted free relative rotary movement with respect thereto. At its outer end the sleeve 41 is provided with fingers 42, which are fitted into peripheral slots 43 in the shell 13 of the high-speed sleeve 12. The sleeve 41 is thus compelled to partake of the rotary movement of the high-speed sleeve, while it is permitted relative endwise movement with respect thereto. To summarize the foregoing, it will be seen that the sleeves 41 and 39 form together the two members of a clutch-controller, secured together against relative endwise movement, but together permitted relative endwise movement with respect to the high and low speed sleeves, the member 41 being compelled to rotate, however, with the high-speed sleeve, while the member 39 is compelled to rotate with the low-speed sleeve. A coil-spring 44 surrounds the inner end of the shell of the high-speed sleeve and bears on one side against the trough-like ring 40, secured to the sleeve 39, and at the other side against the ratchet-ring 38. The said spring tends normally to force the clutch-controller in a direction toward the high-speed clutch 19. The sleeve 39 of the clutch-controller is provided with the notches 45 and 46 and with cam-shaped surfaces 47 between them. The ratchet-ring 38 is provided with radially-projecting lugs or teeth 48, adapted to engage the said notches 45 and 46 and to travel along the cam-surfaces 47. The parts are shown in the drawings with the lugs or teeth 48 of the ratchet-ring in engagement with the notches 45 of the controller, and in such position the controller has been moved to such a distance away from the high-speed clutch 19 as to withdraw the fingers 42 from the path movement of the balls of said clutch. When the said lugs or teeth 48 are in engagement with the notches 45, the clutch-controller will have been moved in a direction toward the high-speed clutch 19 by the spring 44, so as to bring the ends of the fingers 42 into the path of the balls of the said high-speed clutch 19, and will then retain the same in their pockets so as to maintain the high-speed clutch out of operative position.

Assuming the parts to be in the position shown in the drawings—that is to say, with the clutch-controller withdrawn from engagement with the balls of the high-speed clutch 19, and hence with the high-speed clutch operatively connecting the high-speed sleeve with the hub so that the wheel will be driven at the higher speed—and it being desired to change to the low speed, the power-transmitting member will be rotated slightly backward and then driven forward again. On the backward movement the low-speed sleeve will be moved a distance permitted by the slot 36 until the pawl 34 is engaged by the front wall of the said slot. During this movement the sleeve 39 of the clutch-controller will be moved backward with the low-speed sleeve, while the ratchet-ring will be held stationary by the pawl, in turn held against rotation by the tendency of the inclined cam portions of the lug or tooth of the pawl-carrier to ride up the inclined side wall of the notch 32 of the floating member 21 of the clutch, and so as to force the said floating member into engagement with the stationary member, whereby the parts are locked against movement. The sleeve 39 of the clutch-controller will therefore be moved with respect to the ratchet-ring 38 a distance equal to between a notch 45 and a notch 46 in the said sleeve. In so moving, the clutch-controller 43 will move in a direction toward the high-speed sleeve the difference permitted by the inclined surface 47 and the difference in position of the notch 46 to the notch 45, the spring 44 enforcing such movement. The effect of this will be to force the fingers 42 of the clutch-controller sleeve 41 into the path of movement of the balls of the high-speed clutch 19, so as to retain the said balls in the pockets formed in the shell 13 of the said high-speed sleeve 12. The change of gear has now been effected, and upon forward movement of the power-transmitting member the sleeve 39 of the clutch-controller will be moved forward with the low-speed sleeve and by reason of the connection between the notches thereof at that time in engagement with the lugs or teeth 48 of the ratchet-ring 38 will carry the ratchet-ring forward a distance of one tooth—i. e., sufficient to engage the pawl 48, the next successive tooth on the ratchet-ring. Immediately thereafter the pawl 44 will be picked up by the rear wall of the slot 46 of the shell 5 of the low-speed sleeve, and the pawl-carrier will be carried once more therewith, releasing the floating clutch member 21 from engagement with the stationary clutch member and carrying the same freely around with it. Driving connection will now be directly through the low-speed clutch 20, and the wheel will be driven at the low speed. No means are shown for holding the low-speed clutch out of operative connection, as when the high-speed gear is operatively connected through the high-speed clutch 19 the low-speed clutch 20 will be overridden, and hence inoperative. Change may be made back to the high speed by similar back-pedaling movement, which will cause the controller to be moved rotatively relatively to the ratchet-ring, an endwise movement to release engagement of the controller with the high-speed clutch-balls being enforced by the cam-surfaces 47 during such movement.

In changing either from high to low or low to high speed the first backward movement is always a movement of the low-speed sleeve a distance about sufficient to cause the front wall of the slot 36 in the shell 5 of the low-speed sleeve to engage the front of the pawl 34. Further backward movement will force the pawl-carrier around, while the cone-clutch members 21 and 23 are held against rotation. The inclined wall of the lug or tooth 31 of the pawl-carrier will, however, act as a cam against the inclined surface of the notch 32, forcing the ring 23 inwardly against the resistance of the spring 26 until finally the said tooth or lug 31 is engaged by the second notch 33 in the member 21. In this position the parts may be rotated freely backward, and such movement may be employed for the purpose of applying a brake. Immediately the power-transmitting member is moved forward again the member 21 of the cone-clutch will be held stationary against rotary movement and will again be forced inwardly until the lug or tooth 31 passes into the notch 32, when the parts will resume their normal positions.

The brake and brake-operating mechanism forms no part of this invention and will not be described in detail herein, such description being in no way necessary to a complete understanding of the present invention.

It will be obvious that the foregoing is but one embodiment of my invention and that the same is capable of many and varied modifications within the spirit and scope of my invention, and, further, that certain parts may be employed in connection with other parts of different construction. Hence I do not desire to be limited only to the precise details of construction and combination of parts herein.

What I claim is—

1. In bicycle-gearing, the combination with two driving-sleeves geared together to rotate at different relative speeds, a driving member, a stationary axle, and a clutch, of a reciprocating clutch-controller, means intermediate the clutch-controller and the stationary axle for effecting reciprocation of the said clutch-controller, said means operated by movements of the driving member.

2. In bicycle-gearing, the combination with two driving-sleeves geared together to rotate at different relative speeds, a driving member, a stationary axle, and a clutch, of a reciprocating clutch-controller, operating means for reciprocating same, a member adapted to engage a portion stationary with the said axle, said member controlling movements of said operating means, and itself controlled by back-pedaling movements of the driving member.

3. In bicycle-gearing, the combination with two driving-sleeves geared together to rotate at different relative speeds, a driving member, a stationary member, and a clutch, of a clutch-controlling sleeve, operating means for imparting reciprocating movements thereto, means for imparting intermittent movements of rotation in one direction to said operating means, and controlling means therefor operated by back-pedaling movements of the driving member.

4. In bicycle-gearing, the combination with two driving-sleeves geared together to rotate at different relative speeds, a driving member, a stationary member, and a clutch, of a clutch-controlling sleeve, operating means for imparting reciprocating movements thereto, means for imparting intermittent movements of rotation in one direction to said operating means, and controlling means therefor adapted to engage said stationary axle, said controlling means controlled in its movements by back-pedaling movements of the driving member.

5. In bicycle-gearing, the combination with a high-speed sleeve, a low-speed sleeve, a driving member, a stationary axle, a clutch, and a reciprocating clutch-controller, of a friction-clutch comprising a stationary member secured to the stationary axle and a revoluble member rotatably mounted thereon, means controlled by movements of the driving member for operating the friction-clutch, and means controlled by the operation of the friction-clutch for effecting the reciprocation of the said clutch-controller.

6. In bicycle-gearing, the combination with a high-speed sleeve, a low-speed sleeve, a driving member, a stationary axle, a clutch, and a clutch-controller, of an operating member for reciprocating said clutch-controller, means engaging said operating member and adapted to impart intermittent movements of rotation thereto in one direction, a friction-clutch having a member stationary with said stationary axle, and a revoluble member, said revoluble member engaged by said last-named means, said friction-clutch controlled by back-pedaling movements of said driving member.

7. In bicycle-gearing, the combination with a high-speed sleeve, a low-speed sleeve, a driving member, a stationary axle, a clutch, and a clutch-controller, of operating means for the said clutch-controller, a friction-clutch having a member secured to the stationary axle, and a revoluble member, the revoluble member and the operating means for the clutch-controller provided with coacting cam-faces extending in both directions, for causing relative longitudinal movements of the parts, and shouldered portions for causing the parts to rotate together without tendency to impart relative longitudinal movement, the cam-faces extending in both directions between said shouldered portions, said friction-clutch operated by back-pedaling movements of the driving member, substantially as set forth.

8. In bicycle-gearing, the combination with a high-speed sleeve, a low-speed sleeve, a driving member, a stationary axle, a clutch, and a clutch-controller, of operating means for the said clutch-controller, said operating means including a collar having a laterally-projecting tooth, a friction-clutch comprising a member secured to the stationary axle, and a revoluble member, the revoluble member having two sets of cam-faces with which the said tooth is adapted to engage, and having shouldered portions at the opposite ends of said cam-faces, whereby the said collar and clutch member will rotate together in either direction without tendency to longitudinal relative movement, but limited longitudinal movement of the parts will be caused upon the movement of the tooth from engagement with one of said shoulders to engagement with the other of said shoulders, said friction-clutch operated by back-pedaling movements of the driving member.

9. In bicycle-gearing, the combination with a high-speed sleeve, a low-speed sleeve, a driving member, a stationary axle, a clutch and a clutch-controller, of a friction-clutch comprising a member rigid upon said stationary axle, and having a portion mounted on and carried by said member, said portion rotatively and radially fixed on said member, but having limited longitudinal movements with respect thereto, said portion carrying the friction-surface, and a revoluble member freely mounted upon the said stationary axle, means controlled by back-pedaling movements of the driving member for operating the friction-clutch, and means controlled by operation of the friction-clutch for effecting operation of the said clutch-controller.

10. In bicycle-gearing, the combination with two driving-sleeves geared together to rotate at different relative speeds, and a clutch, of a clutch-controller comprising two sleeves, one of said clutch-controlling sleeves rotatably mounted upon one of said driving-sleeves, but movable longitudinally with respect thereto, the other of said clutch-controlling sleeves rotatably mounted upon the other of said driving-sleeves, but movable longitudinally with respect thereto, and a member connecting the two sleeves together longitudinally, but permitting relative rotation thereof with respect to each other; and means for shifting the clutch-controller longitudinally with respect to the said driving-sleeves.

11. In bicycle-gearing, the combination with two driving-sleeves geared together to rotate at different relative speeds, a driving member, and a clutch, of a clutch-controller comprising two sleeves, one of said clutch-controlling sleeves rotatably mounted upon one of said driving-sleeves, but movable longitudinally with respect thereto, the other of said clutch-controlling sleeves rotatably mounted upon the other of said driving-sleeves, but movable longitudinally with respect thereto, and a member connecting the two sleeves together longitudinally, but permitting relative rotation thereof with respect to each other; and means operated by back-pedaling movements of the driving member for shifting the clutch-controller longitudinally with respect to the said driving-sleeves.

HYLA F. MAYNES.

Witnesses:
C. F. CARRINGTON,
C. L. HALL.